United States Patent
Barker

[15] 3,684,420
[45] Aug. 15, 1972

[54] SHOE SOLE MOLDING MACHINES

[72] Inventor: Joseph Barker, Union Works, Belgrave Road, Leicester, England

[22] Filed: July 1, 1970

[21] Appl. No.: 51,501

[30] Foreign Application Priority Data

July 2, 1969 Great Britain..........33,301/69

[52] U.S. Cl. ................425/242, 425/119, 425/817, 425/246
[51] Int. Cl. .............................................B29h 5/12
[58] Field of Search.......18/20 R, 20 P, 30 PA, 20 H, 18/30 NY, 30 NZ, 30 PM, 30 PR, 30 WV, DIG. 62, 5 P, 2 S, 5 RR, 6 S, 17 S, 34 S; 264/328

[56] References Cited

UNITED STATES PATENTS

| | | |
|---|---|---|
| 3,555,609 | 1/1971 | Chu et al..............18/17 S UX |
| 3,328,500 | 6/1967 | Barnette................264/255 X |
| 3,111,710 | 11/1963 | Plymale................18/DIG. 62 |
| 3,413,682 | 12/1968 | Wucher................18/34 S UX |
| 3,501,810 | 3/1970 | Powell....................18/30 NY |

FOREIGN PATENTS OR APPLICATIONS 1,008,242   10/1965   Great Britain..........18/30 PR

*Primary Examiner*—Robert L. Spicer, Jr.
*Attorney*—Richard A. Wise, Richard B. Megley and Vincent A. White

[57] ABSTRACT

Apparatus for injection molding shoe bottoms in which the bottom mold is inclined so that plastic material injected into one lower end flows upwardly at an angle toward the upper end to avoid entrapment of gases. A plurality of molds are mounted on a rotatable turret, each mold being movable outwardly to engage an injection nozzle.

1 Claim, 5 Drawing Figures

Inventor
Joseph Barker
By his Attorney
Vincent A. White

SHOE SOLE MOLDING MACHINES

BACKGROUND OF THE INVENTION

The invention relates to machines for injection molding of shoe bottom units either as separate units for subsequent attachment to a shoe or by molding directly onto the bottom of a lasted shoe as shown in U. S. Pat. No. 3,055,056. It has been found particularly advantageous in the manufacture of shoes to utilize shoe bottom units of a cellular material such, for example, as polyurethane foam. However, it was found that when such material was injected into a mold cavity in an unfoamed condition in the usual manner, the tread surface of the molded shoe bottom often would be malformed due to entrapment of air or other gas generated during foaming of the material.

STATEMENT OF THE INVENTION

Accordingly, it is an object of the invention to provide an improved machine for molding shoe bottoms which avoids the above objection. To this end, foamable material is injected into one end of a bottom mold cavity (preferably the toe end) which is inclined so that air or other gases generated both during mold filling and during the foaming of the material are free to rise and be swept toward the other upper end of the mold cavity. It was found that an angle of mold inclination of between 15° and 25° to the horizontal produced acceptable results and avoided malformation of the shoe bottom due to entrapped gases. According to one feature of the invention a plurality of such inclined molds are carried on a rotatable turret for location of successive molds at a unit at the periphery of the turret for injecting foamable material into each mold cavity.

The above and other features of the invention together with novel details of construction and combinations of parts will now be described with particular reference to the drawings and thereafter particularly pointed out in the claims. It should be understood that the particular mechanisms described as embodying the invention are disclosed by way of illustration only and not as limitations of the invention. The principles and features of this invention may be used in varied ways and in numerous embodiments without departing from the scope of the invention.

Figure 1:
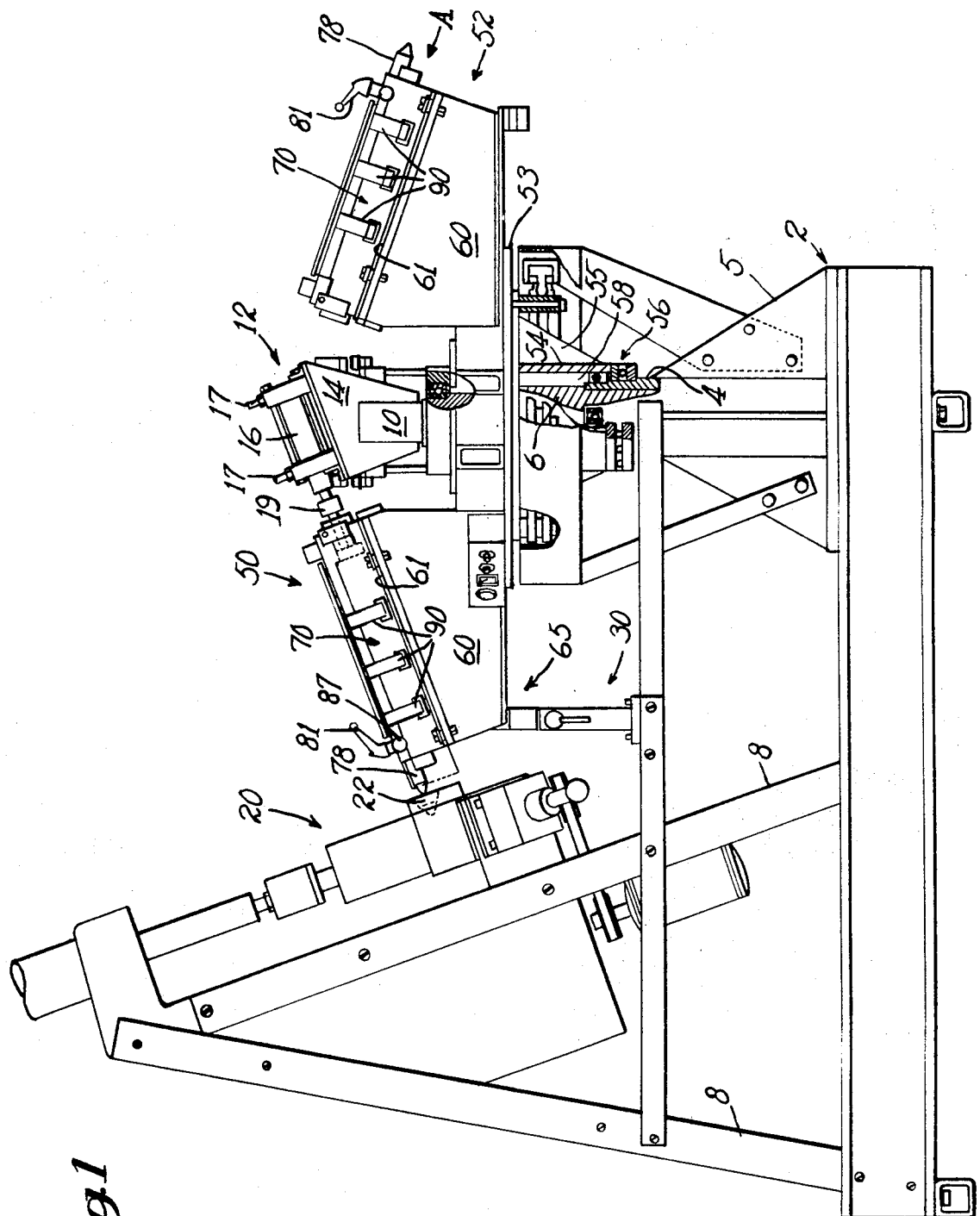
FIG. 1 is a side view, partly in section, of an illustrative machine embodying the invention.

The machine shown in FIG. 1 is adapted for use in the molding of shoe bottom units of a foam material such as polyurethane foam. The machine includes an injection mechanism 20, and molding apparatus 50 for use with the injection mechanism, the molding apparatus also being illustrative of the invention in certain of its aspects. The machine comprises a frame 2 and a hollow cylindrical sleeve 4 secured in a vertical position to the frame 2 by supporting webs 5. Secured within the sleeve 4 and extending upwardly therefrom is a cylindrical shaft 6 having a vertical axis. The frame 2 also has upwardly extending struts 8 which support the injection mechanism 20 adapted to inject a foamable mixture such as of polyurethane foam constituent compositions from an outlet 22. The injection mechanism, by way of example, may be similar to that disclosed in U. S. Pat. No. 3,409,174 to which reference may be made for details of construction and operation of a typical injection mechanism that may be used. The injection outlet 22, as seen in FIG. 1, is disposed at an angle of 20° to the horizontal, and faces the vertical axis of the shaft 6.

Secured to an upper end portion of the shaft 6 are two brackets 10 (FIGS. 1 and 3) on which a positioning mechanism 12 of the machine is mounted. The positioning mechanism comprises two support plates 14 carrying a cylinder 16. The cylinder has two ports 17 by which fluid under pressure may be admitted to operate a piston (not shown) having a piston rod 18 with a head 19. The longitudinal axis of the cylinder 16 extends at 20° to the horizontal with the head 19 generally facing the outlet 22 of the injection mechanism 20.

Figure 4:
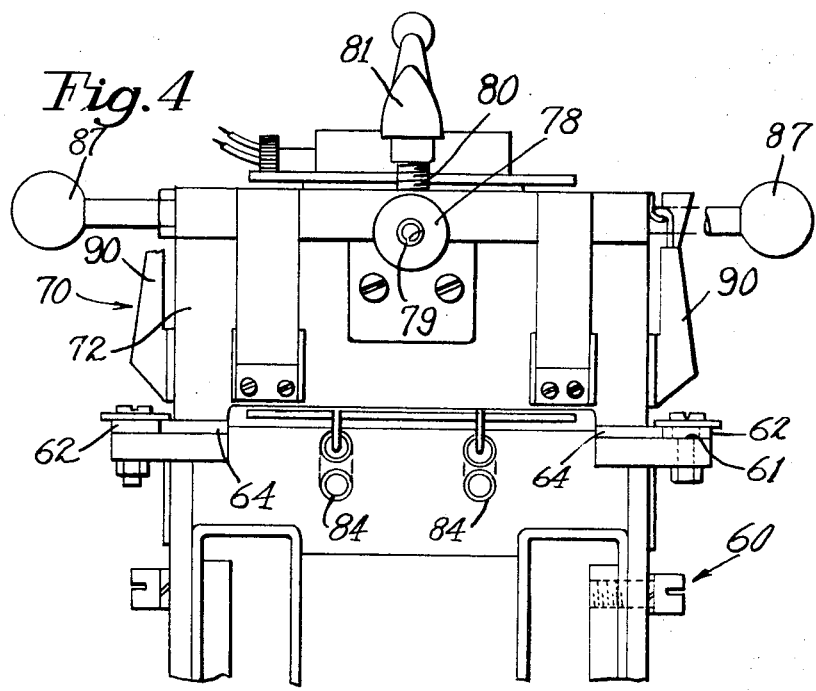
FIG. 4 is an end view of a mold assembly looking in the direction of arrow A of FIG. 1.

The molding apparatus 50 comprises a turret assembly 52 rotatably mounted on the shaft 6 and includes a horizontal circular table 53 and a hollow cylindrical sleeve 54 extending downwardly from the table and secured thereto by triangular webs 55. A lower end portion of the sleeve rests on a thrust bearing 56 secured to the sleeve 4, and an inner portion of the sleeve 54 is mounted for rotation on the sleeve 4 through a bearing 58. Mounted on the table 52 and uniformly spaced around the vertical axis of the shaft 6 are four mold supporting assemblies 60. Each supporting assembly includes an upwardly, and generally outwardly facing surface 61 which also extends at 20° to the horizontal. Each assembly 60 has two parallel guides 62 projecting above and at opposite sides of the surface 61, and two bearing tracks mounted on the surface parallel to the guides. Each supporting assembly carries a mold assembly 70 comprising a carriage 72, a bottom mold member 74 secured to the carriage, and a top mold member 76 hinged to the bottom mold member and adapted to close a bottom mold cavity 75. The top mold member 76 is provided with two handles 87 which may be grasped by an operator to move the top mold member between open and closed positions. The bottom mold member has six clips 90 to secure the top mold member in its closed position relative to the bottom mold member (see especially FIG. 4). It should be apparent that a shoe form with a lasted upper thereon could be used, as well known in the art, in place of the top mold member to close the cavity 75. In this manner, the sole bottom member could be molded directly onto the shoe bottom rather than to form a separate bottom unit for subsequent attachment.

Figure 3:
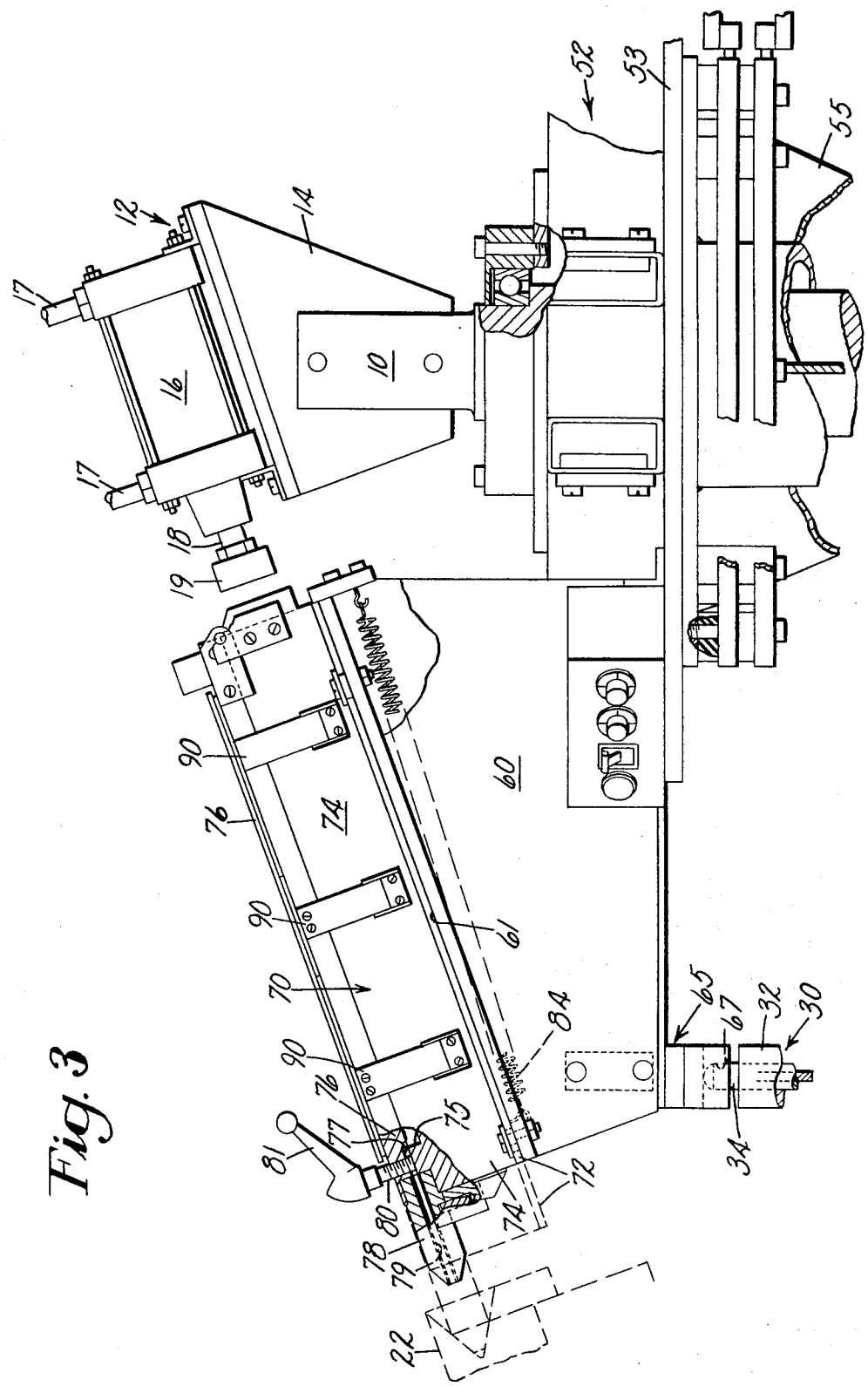
FIG. 3 is an enlarged side view of part of the mechanism seen in FIG. 1.

Secured to the lower and outward end of the bottom mold member 74 is an inlet nozzle 78 having an inlet bore 79 (see especially FIG. 3). When the top mold member is in its closed position, as seen in FIG. 3, a groove 77 in the top mold member, together with a top surface of a peripheral wall of the bottom mold member bounding the cavity 75, provides a short sprue passage extending from the inlet bore 79 to the cavity. Mounted on the top mold member and adapted to close the sprue passage is a closure member of the mold assembly provided by a screw plug 80 which may be rotated to enter the groove 77 by a handle 81.

Figure 5:
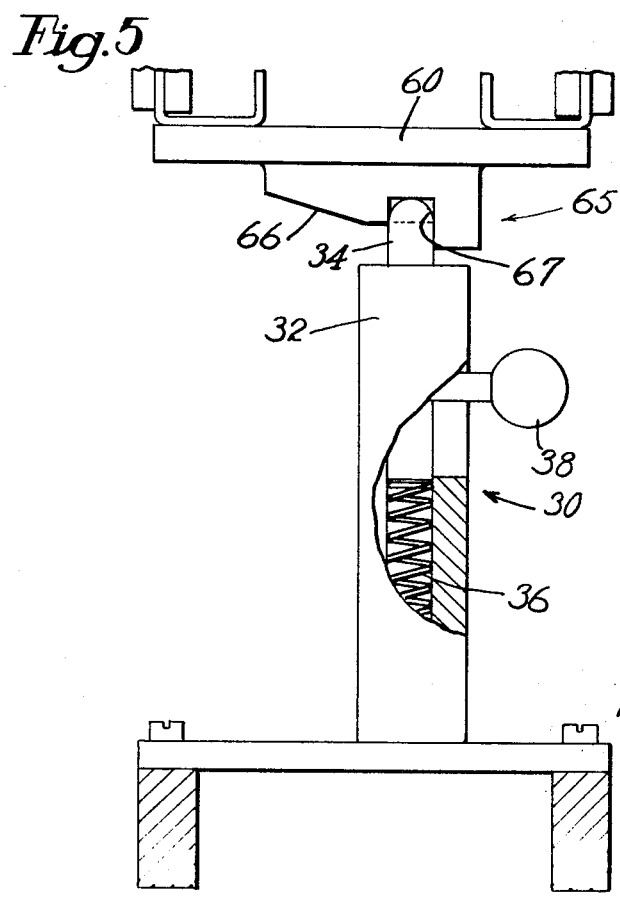
FIG. 5 is an enlarged side view of a mechanism for locating and locking molds at an injection station of the machine.

Each mold assembly 70 is mounted for sliding movement on the surface 61 of its associated supporting assembly 60 on the bearing tracks 64 and between the two guides 62. The assembly is urged away from the injection mechanism 20 toward the vertical shaft 6 by two springs 84 each extending between a hook secured to an outer portion of the carriage 72 and a hook secured to an inner portion of the supporting assembly 60 as best seen in FIG. 3. Secured to an under surface of each supporting assembly at a forward portion thereof is an engagement device 65 comprising a cam member having a cam surface 66 having a slot 67 (see FIG. 5). Secured to the frame 2 in front of the injection mechanism 20 (FIG. 1) is a locking device 30 comprising a sleeve 32, a rod 34 slidably mounted in the sleeve and urged to an uppermost position by a spring 36, and a handle 38 extending from the rod 34 through a slot in the sleeve.

Figure 2:
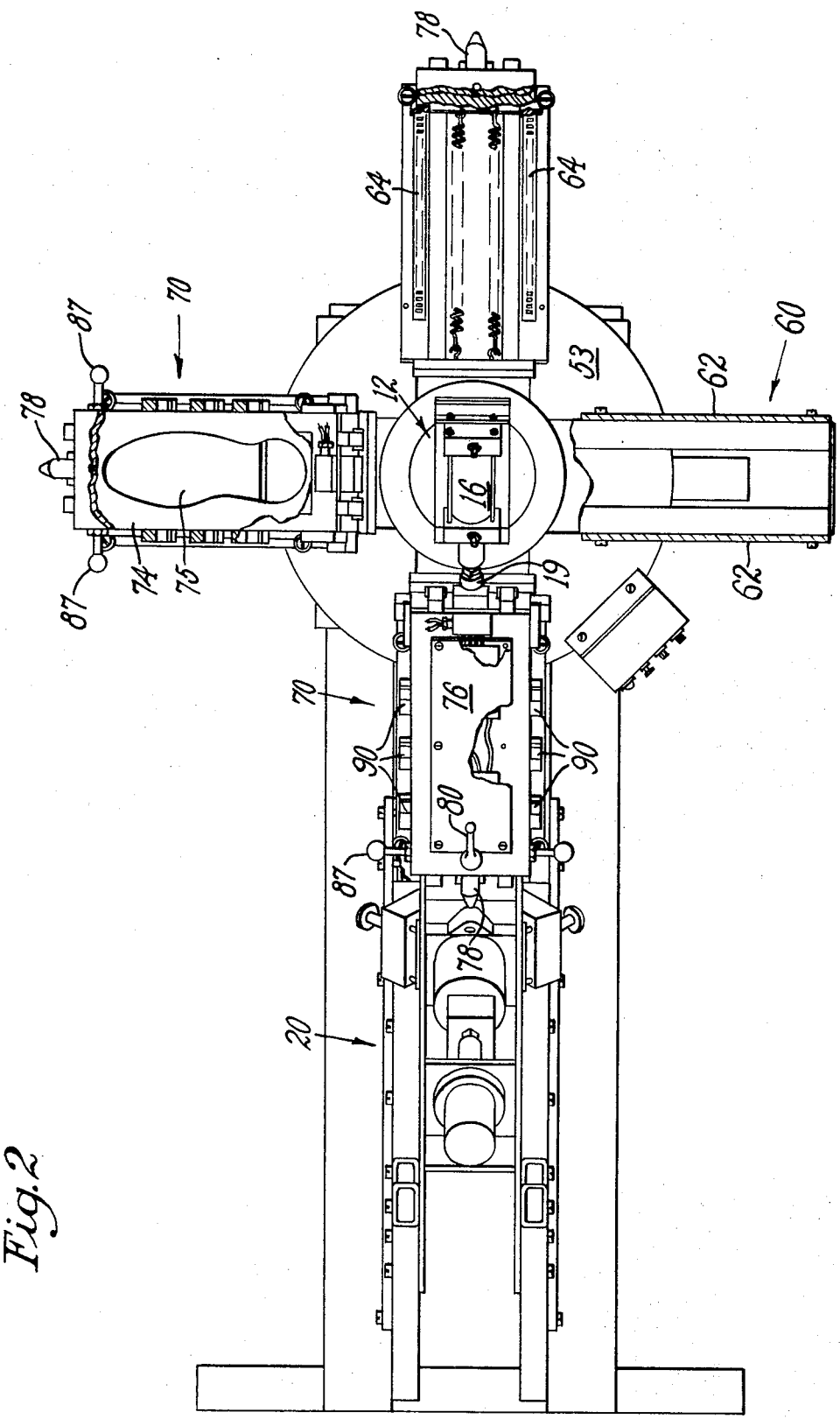
FIG. 2 is a plan view of the machine shown in FIG. 1 with parts broken away.

In the use of the illustrative machine in the molding of shoe bottom units of foam material, the turret assembly is rotated in a clockwise direction (FIG. 2) to bring a first of the mold assemblies 70 to the injection station in front of the injection mechanism 20. The cam surface 66 of the engagement device 65 engages the rod 34 of the locking device, and during final movement of the mold assembly the rod enters the slot 67 to locate and lock the first mold assembly at the injection station. The top mold member is at this stage in its closed position, and the closure member 80 is in a position such that the sprue passage is open. The positioning mechanism 12 is then operated and the piston rod 18 outstrokes, the head 19 engaging the mold assembly 70 and moving the carriage 72 outwardly toward the injection mechanism. The inlet nozzle 78 enters the outlet 22 of the injection mechanism, and the injection mechanism is caused to operate to inject a desired quantity of a foamable mixture through the inlet bore 79, along the sprue passage 77 and into the mold cavity 75. On completion of the injection, the closure member 80 is rotated to close the sprue passage. The mixture in the mold cavity subsequently expands to fill the mold cavity, (air or other gases being swept upwardly along the cavity and escaping through a copilliary outlet, not shown, at the upper end of the cavity), and solidifies therein. Thereafter, the handle 38 of the locking device is lowered, allowing the turret assembly to be further rotated about said axis and a second of said four stations to be moved to the injection station.

It should be apparent from he foregoing description that various substitutions of equivalent mechanisms and parts may be made without departing from the scope of the invention.

Having thus described my invention, what I claim as new and desire to secure by Letters Patent of the United States is:

1. Apparatus for molding shoe bottoms of foamed material including a mold assembly having a cavity in which a shoe bottom is to be formed, said cavity being generally disposed along a plane inclined from 15° to 25° to a horizontal plane with the toe forming end of the cavity at the lower end and the heel forming end of the cavity with any associated ledges at the upper end of said plane, an inlet on said assembly leading into the lower end of said cavity, a rotatable table, a plurality of mold assemblies mounted on said table, means for locating the table for successively aligning the mold inlet of each mold assembly with an injection outlet, means mounting each assembly on the table for movement radially outward for engaging said inlet with the injection outlet, and means for injecting a desired amount of said material in foamable condition through said inlet into the lower end of said cavity whereby said material foams and expands toward the heel end of said cavity and air in the cavity and excess gases generated during foaming of the material flow heightwise along the inclined cavity and escape from the upper end of the cavity.

* * * * *